(12) United States Patent
Webb et al.

(10) Patent No.: US 11,060,547 B2
(45) Date of Patent: Jul. 13, 2021

(54) UPHOLSTERED FURNITURE COMPONENT CONNECTION SYSTEM

(71) Applicant: Ashley Furniture Industries, LLC, Arcadia, WI (US)

(72) Inventors: William Robert Webb, Boonville, NC (US); Roger Jeffrey Anderson, Mooresville, NC (US)

(73) Assignee: Ashley Furniture Industries, LLC, Arcadia, WI (US)

( * ) Notice: Subject to any disclaimer, the term of this patent is extended or adjusted under 35 U.S.C. 154(b) by 0 days.

(21) Appl. No.: 16/399,444

(22) Filed: Apr. 30, 2019

(65) Prior Publication Data

US 2019/0331159 A1    Oct. 31, 2019

Related U.S. Application Data

(60) Provisional application No. 62/664,715, filed on Apr. 30, 2018.

(51) Int. Cl.
*F16B 37/04*    (2006.01)
*A47C 1/02*    (2006.01)

(52) U.S. Cl.
CPC .............. *F16B 37/045* (2013.01); *A47C 1/02* (2013.01)

(58) Field of Classification Search
CPC ......... F16B 37/045; A47C 1/02; A47C 31/00; A47C 31/02
See application file for complete search history.

(56) References Cited

U.S. PATENT DOCUMENTS

| | | | |
|---|---|---|---|
| 2,528,950 | A | 11/1950 | Engstrom |
| 3,516,633 | A | 6/1970 | Blackwood |
| 3,525,549 | A | 8/1970 | Knabusch et al. |
| 3,700,282 | A | 10/1972 | Rowland |
| 3,799,611 | A | 3/1974 | Steinfeld |
| 4,385,783 | A | 5/1983 | Stephens |
| 4,828,324 | A | 5/1989 | Putnam |
| 5,184,871 | A | 2/1993 | Lapointe et al. |
| 5,277,476 | A | 1/1994 | Caldwell |

(Continued)

OTHER PUBLICATIONS

International Search Report for Application No. PCT/US2019/29977, dated Jul. 19, 2019 for (2 pages).
Admitted Prior Art Spacer, prior to Apr. 30, 2018.

*Primary Examiner* — Philip F Gabler
(74) *Attorney, Agent, or Firm* — Christensen, Fonder, Dardi & Herbert PLLC

(57) ABSTRACT

An upholstered component, such as panels, assembled onto a furniture frame or a chair mechanism by way of a connection system provides a robust connection and economical manufacturing process. The connection includes a T-nut and a spacer attached on opposite sides of a wood form to be upholstered. The threaded barrel of the T-nut inserted in a hole through the wood form and with T-nut prongs embedding into a surface of the side of the wood form that will be facing outwardly on the furniture. The spacer is inserted into the hole at the opposite side of the wood form and is retained therein by an interference fit. The wood form is upholstered and is then attached to the furniture frame or mechanism with a bolt connecting to the furniture frame or mechanism and then extending through the spacer, into the hole and into the threaded barrel of the T-nut.

12 Claims, 8 Drawing Sheets

(56) References Cited

U.S. PATENT DOCUMENTS

| | | | |
|---|---|---|---|
| 5,478,133 A | 12/1995 | Tidwell, Jr. | |
| 5,678,897 A | 10/1997 | Prestia | |
| 5,820,089 A * | 10/1998 | Lim | A47B 91/00 248/188.8 |
| 6,543,828 B1 | 4/2003 | Gass | |
| 6,854,943 B2 * | 2/2005 | Nagayama | F16B 37/065 411/179 |
| 8,061,643 B2 * | 11/2011 | Gingras | D21D 1/306 241/298 |
| 8,777,319 B2 * | 7/2014 | Brandtner | A47C 4/02 297/440.15 |
| 2006/0182513 A1 * | 8/2006 | Dortch | F16B 23/0092 411/338 |
| 2009/0016807 A1 | 1/2009 | Koch | |
| 2014/0239698 A1 | 8/2014 | Griggs, Jr. | |

* cited by examiner

UPHOLSTERED FURNITURE COMPONENT CONNECTION SYSTEM

RELATED APPLICATIONS

This application claims the benefit of U.S. Provisional Patent Application No. 62/664,715, filed Apr. 30, 2018, the disclosure of which is hereby incorporated by reference in its entirety.

FIELD OF THE DISCLOSURE

This invention relates to upholstered furniture. More specifically, this invention relates to upholstered components attached to a chair or sofa frame. Even more specifically, this invention relates to attaching upholstered panels to frames or other mechanisms.

BACKGROUND OF THE INVENTION

Upholstered furniture typically has upholstered components, such as panels, that are attached to chair or sofa frames or chair mechanisms. The upholstered components include a substrate or wood form such as a wood board cut to a specific shape or two or more cut wood boards secured together. "Wood" herein includes wood products such as particle board, chip board, and plywood. "Wood form" includes a single wood piece or several wood pieces secured together such as by glue and fasteners. The wood pieces or forms are covered with layers of material, for example a layer of padding and an outer exposed upholstery fabric or other upholstery material. The layers of padding and outer exposed upholstery material have edge portions that are secured, such as by stapling, onto an inside facing surface of the wood piece or wood form with the outside facing surface of the wood form covered without any exposed free edges of the layers of material. The upholstered wood piece or form needs to be securely attached to the frames or mechanisms after being covered with the layers of material.

One specific example of a piece of upholstered furniture having upholstered components that need attachment are recliners. Recliners have mechanisms that allow users to transition from a seated to a reclined position while being supported by the recliner. For the comfort of the user, the end of the mechanism is connected to an ottoman, which is an upholstered component, supporting the feet and/or legs in the reclined positions. Referring to Prior Art FIGS. 17 and 18, in one conventional construction technique, holes 9 are provided to the wood piece or wood form 10 before the layers of upholstery material are applied and T-nuts 11 are secured to outside facing surface 12 of the wood form. An oblong spacer 13 with an oblong apertures 14 and a stapling tab 15 is attached to the inside facing surface 16 of the wood form, with the holes positioned inside the elongate aperture, by stapling the tab. The upholstered layers of material may then be applied to the wood piece or form. The bulky oblong spacer must be avoided when applying the upholstery. The upholstered panel or form is then secured to the frame or mechanism with a bolt extending though a bracket or portion of the frame or mechanism, through the attached elongate spacer and into the T-nut that is secured to the outside surface of the wood form that is part of the upholstered panel or upholstered form. The inside surface is not generally exposed on the upholstered furniture. The oblong spacer is not conducive to automated assembly and uses more material than is necessary to effectively create space between the ottoman wood piece and the bracket. Also, it provides bulk that must be accommodated during the upholstery application.

SUMMARY OF THE INVENTION

Upholstered furniture with upholstered components, such as panels, assembled onto a furniture frame or a chair mechanism by way of a connection system provides a robust connection and economical manufacturing process. In embodiments, the connection comprises a T-nut and a spacer configured as a bushing with a central bore and with two adjacent axial portions, a first portion of the spacer having a first lesser outside diameter and a second portion of the spacer having a second greater outside diameter. The T-nut and spacer attach on opposites sides of a wood form to be upholstered, the threaded barrel of the T-nut inserted in a hole through the wood form and with T-nut prongs embedding into a surface of the side of the wood form that will be facing outwardly on the furniture, the spacer is inserted into the hole at the opposite side of the wood form and is retained therein by an interference fit. The wood form is upholstered and is then attached to the furniture frame or mechanism with a bolt connecting to the furniture frame or mechanism and then extending through the spacer, into the hole and into the threaded barrel of the T-nut. The bolt is tightened compressing the wood form and spacer and the connection portion of the furniture frame of mechanism between the bolt head and the T-nut.

The spacers described herein may be cylindrical or prismatic portions that receive a single bolt and are secured using an interference fit between the spacer and the wall of a hole a wood form and/or the barrel of a T-nut placed in the hole. The interference fit prevents the spacer from shifting or falling out of position while moved around during assembly. Using individual spacers that utilize an interference fit for each hole decreases the total amount of polymer material used for spacers compared to the conventional oblong spacer, uses less components, is less expensive, and is more conducive to automated assembly processes.

The connection system, in embodiments having a spacer, a T-nut, and a bolt. In embodiments, the spacer is polymeric and has two sections, an anchor portion and a separator portion. In embodiments, the anchor portion is cylindrical with a bore extending through the center. The outside diameter of the anchor portion is sized to create an interference fit with the ottoman wood form at the hole having an inside diameter less that the outside diameter of the anchor portion. The interior diameter is sized to create an interference fit with the outer diameter of the T-nut. In embodiments, only one of the two interference fits are required. The end of the anchor portion may be chamfered on the inner or outer diameter or both. In embodiments, the height of the anchor portion is less than the thickness of the ottoman wood form. The separator portion is cylindrical or prismatic with an outer diameter larger than the outer diameter of the anchor portion and the diameter of the hole in the ottoman wood form. The difference in diameter provides a flat shoulder at the juncture that lies flush against the ottoman wood form when assembled. In embodiments a flange may be added at the juncture for more surface area engagement with the wood form. The length of the separator portion is determined by the desired space between the ottoman wood form and the bracket as the separator portion defines that distance. When assembled the T-nut is secured in the hole in the ottoman wood form with the flange flush to the ottoman wood form and prongs extending into the wood form. The anchor portion of the spacer is inserted into the hole in the ottoman wood form with the T-nut inside the bore of the anchor portion and the exterior diameter of the anchor portion is in contact with the inner diameter of the hole in the base. The shoulder of the separator portion is flush to the ottoman wood form. Upholstery is applied over the ottoman wood form with the upholstery portion covering the side of the ottoman wood form with the flange of the T-nut. The bolt is inserted through the hole in the bracket, the spacer, and the T-nut. The system may be assembled manually, by automation, or a combination of both.

In an embodiment, a recliner mechanism for a chair having a retractable ottoman has a robust connection system as described herein for attaching an upholstered ottoman component, to the mechanism. The recliner mechanism extends the recliner from an upright seating position to a reclined position. The recliner mechanism having an ottoman bracket movable from a retracted tucked-in position below a seat, to an elevated outward position. The ottoman bracket having a pair of spaced holes for attachment of the upholstered ottoman component. The upholstered ottoman component comprising an ottoman wood form, which may be a wood panel, with an upholstered side that is positioned on the outside of the recliner mechanism when the recliner is in the upright seating position and that faces upward when the recliner is in the reclined position so that the feet and/or legs of the user rest on the upholstered side. The ottoman wood form covered with upholstery material and having a hole with the T-nut on an outside facing surface of the wood form, a spacer with cylindrical portions having an interference fit in the hole, and a bolt extending through the ottoman bracket, through the spacer, through the hole, and threadingly engaged with the T-nut.

A feature and advantage of embodiments is that the upholstered component is separated from the metal bracket, polymer spacers are sandwiched between the wood form and the metal bracket, the polymer providing a resilient contact surface, softer than metal, for making a secure engagement with the metal bracket and the wood form. A feature and advantage of embodiments is that the surface area of the polymer spacers as described herein that contacts the wood form and metal bracket is minimized allowing facilitating direct contact between the spacer and the wood form. That is the spacer may extend through a relatively inconspicuous slit or hole in the upholstery without creating a significant visual anomaly. Additionally, where the upholstery is sandwiched between the spacer and the wood form, the minimal surface area of engagement allows compression of the minimal amount of upholstery, compared to the prior art spacers, and a more secure and uniform connection.

DETAILED DESCRIPTION

Figure 1:
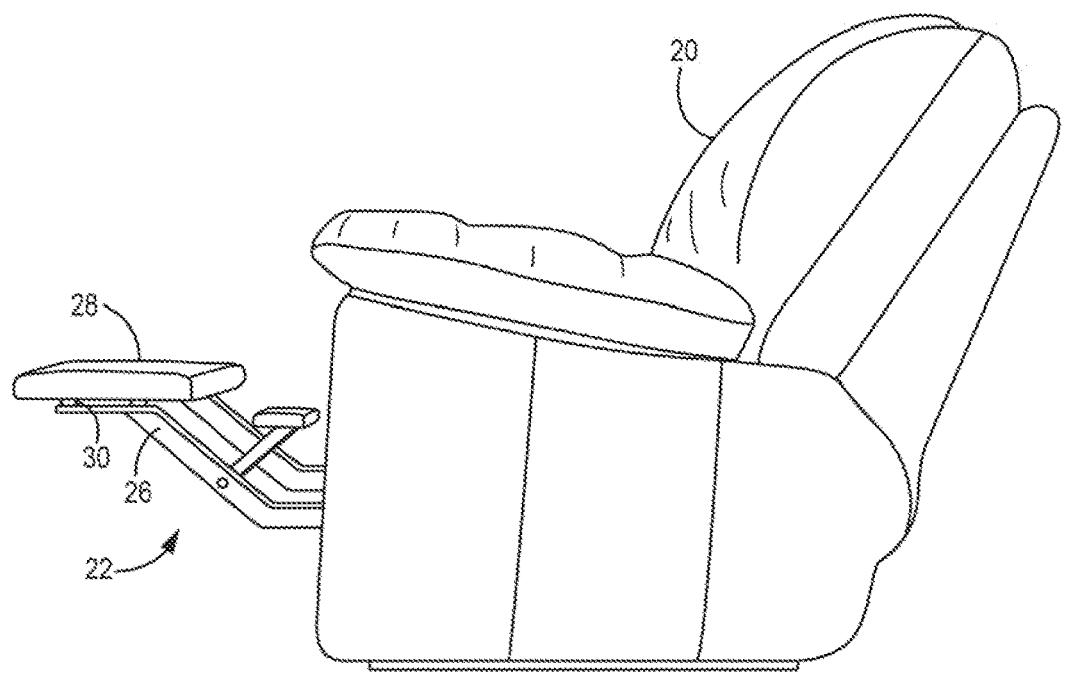
FIG. 1 is a side elevation view of a recliner in accord with embodiments.
Figure 2:
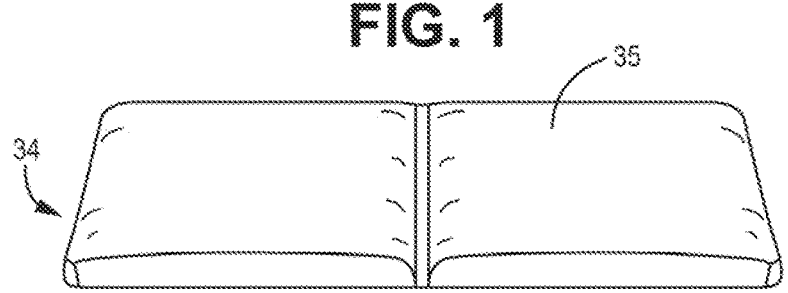
FIG. 2 is a perspective view of an upholstered ottoman component suitable for the recliner of FIG. 1.
Figure 3:
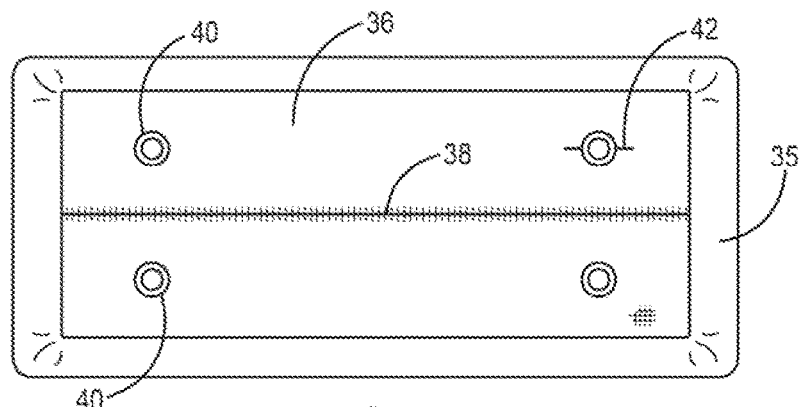
FIG. 3 is a bottom view of the upholstered ottoman component of FIG. 2.
Figure 4:
FIG. 4 is a side elevational view of the ottoman component of FIGS. 2 and 3.

Referring to FIG. 1, an upholstered chair 20, specifically a recliner, with a recliner mechanism 22, is shown in an extended reclined position. The recliner mechanism has an ottoman bracket 26 with an upholstered ottoman component 28 secured thereto by a connection system 30. The upholstered component 28 is further illustrated in FIGS. 2-4 separated from the recliner mechanism and has an upholstery case 34. The case has an outer upholstery layer 35, a backing fabric 36 stitched to the upholstery layer 35, and a zipper 38. Spacers 40, part of the connection system 30, are illustrated extending through the case at apertures or slits 42.

Figure 5:
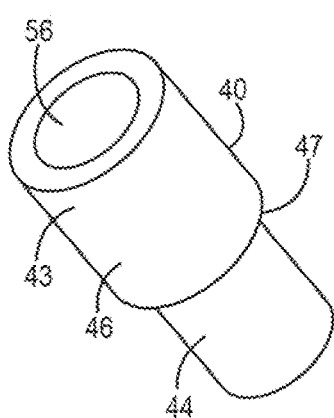
FIG. 5 is a perspective view of a spacer from one end.
Figure 6:
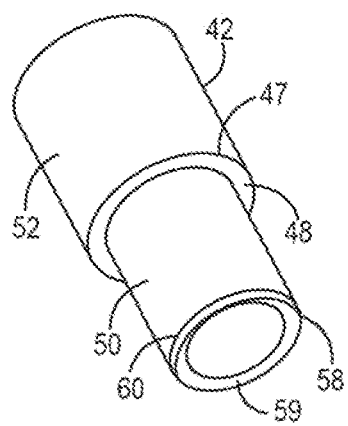
FIG. 6 is a perspective view of the spacer of FIG. 5 from an opposite end.
Figure 7:
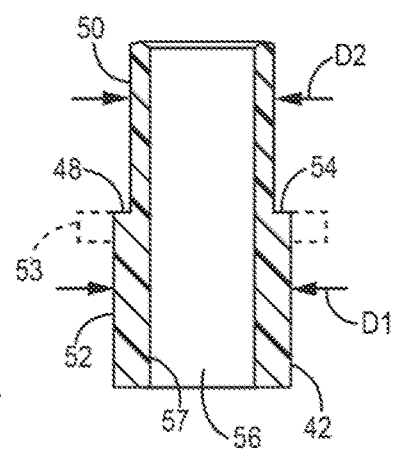
FIG. 7 is a cross sectional view of the spacer of FIGS. 5 and 6.

Referring to FIGS. 5-7, further details of the spacer 40 in accord with embodiments, are illustrated. The spacer has a body 43 including two cylindrical portions, an anchor portion 44, and a separator portion 46, the separator portion 46 having an outside diameter D1 that is greater than the outside diameter D2 of the anchor portion 44. A shoulder 47 with a stop surface 48 extends between the anchor portion outer surface 50 and the separator portion outer surface 52. In embodiments, a flange 53 may be placed at the juncture 54 of the anchor portion 44 and separator portion 46. See FIG. 7. A bore 56 defined by an interior surface 57 extends axially through the spacer body 43. The end 58 of the spacer may have tapered surfaces 59, 60 for facilitating installation as described below. See FIG. 6. The spacer 40 may be formed of a polymer material, for example, polyethylenes, polyurethanes, nylons, or the like, and may be injection molded.

Figure 8:
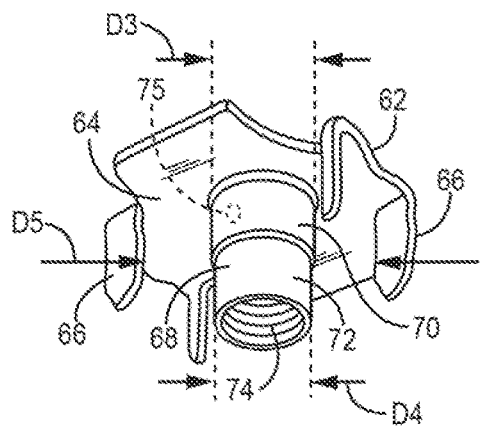
FIG. 8 is a perspective view of a T-nut in accord with embodiments.

Referring to FIG. 8, a T-nut 62, part of the connection system 30, has a flange portion 64 with a plurality of prongs 66 unitary with and extending therefrom and a unitary barrel portion 68 having an enlarged portion 70 with a diameter D3 and a reduced diameter portion 72 with a diameter D4. The enlarged portion 70 and reduced diameter portion 72 maybe generally cylindrical or may have a taper. In such a case, the average diameter D3 of the enlarged portion is greater than the average diameter D4 of the reduced diameter portion. Opposing prongs having an inside dimension of D5. The barrel 68 has a threaded inside wall 74. Such T-nuts are commonly used in furniture construction and are stamped from metal. In embodiments, the T-nut barrel may have nubs 75 or teeth projecting from the enlarged portion 70 to grab into the anchor portion. In embodiments, the prongs 66 may have teeth or ridges to facilitate engagement with a surface.

Figure 9A:
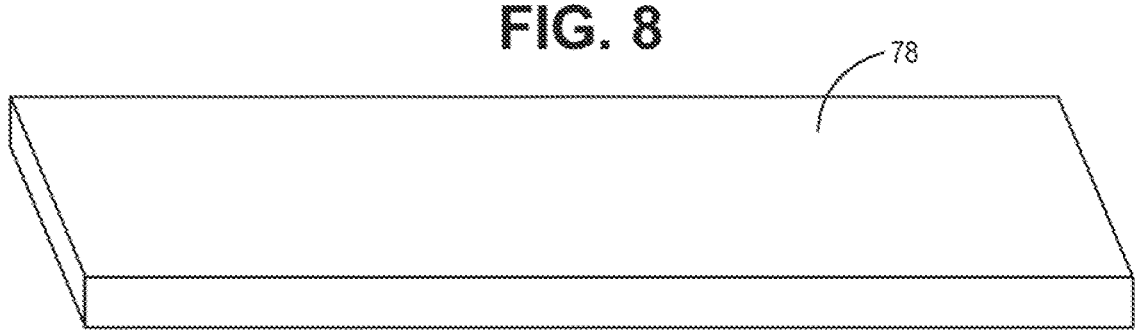
FIG. 9A is a perspective view of a wood form before drilling holes in accord with embodiments.
Figure 9B:
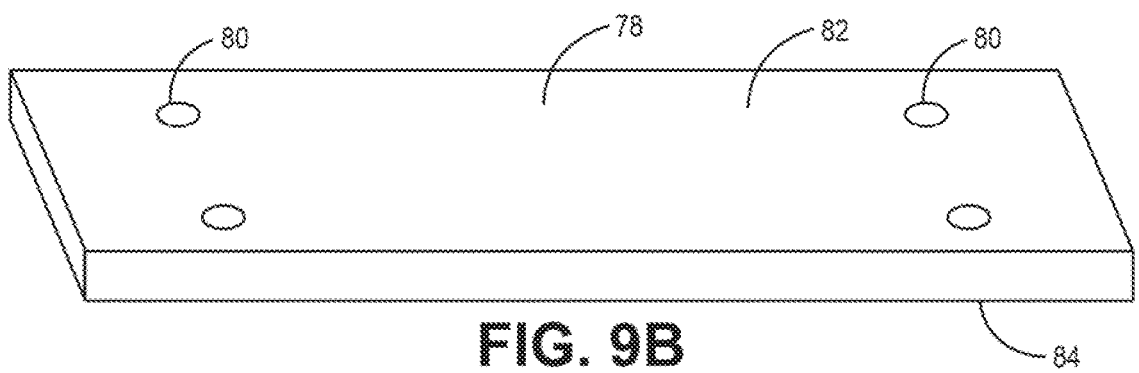
FIG. 9B is a perspective view of the wood form of FIG. 9 with holes therein.

Referring to FIGS. 9A and 9B, a wood form 78 is cut to size for the particular upholstery application. Holes 80 are drilled at the specific locations for attachment to the furniture frame including ottoman brackets on recliner mechanisms. The holes may be constant diameter and, in embodiments, are sized for providing an interference fit with the anchor portions 44 of the spacers 40 and are oversized with respect to the barrel of the T-nuts and are undersized with respect to the inside dimension D5 between opposing prongs. The wood form has an inwardly facing surface 82 and an outwardly facing surface 84. Hole 80 has a length extending from inwardly facing surface 82 to outwardly facing surface 84. In that the wood form portrayed is symmetrical about a plane through the form, there is no difference at this point which side is inwardly facing and which side is outwardly facing.

Figure 10:
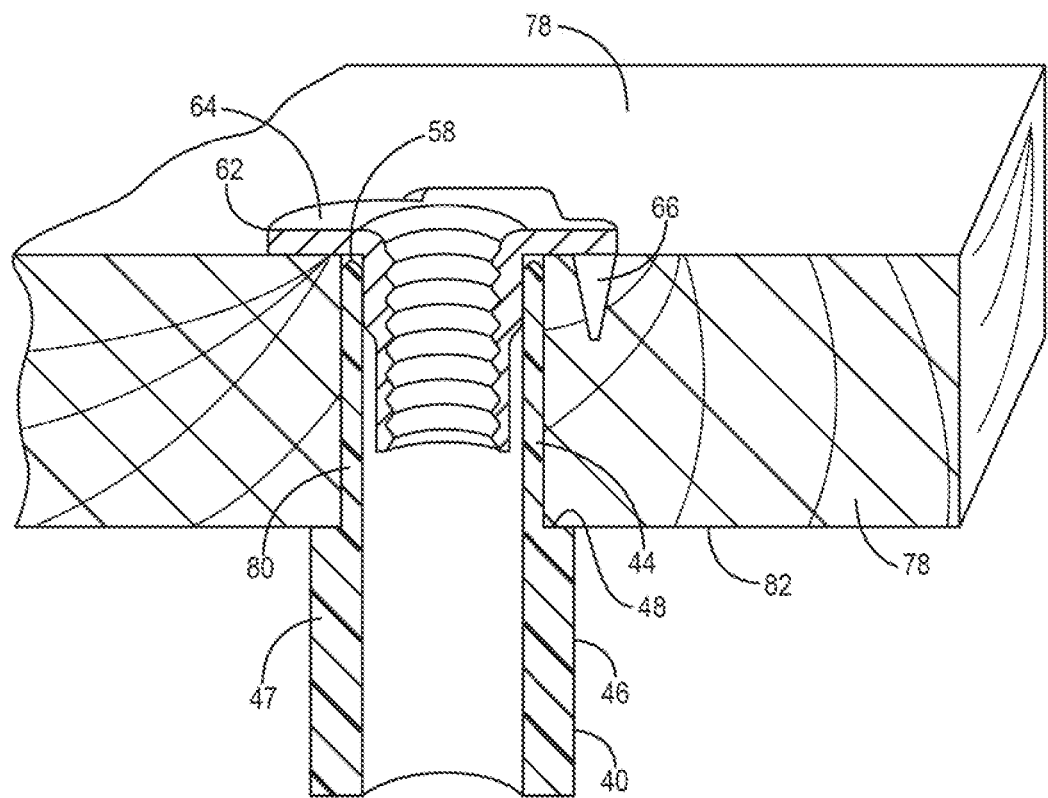
FIG. 10 is a cross sectional view of a T-nut and spacer engaged with a wood form in accord with embodiments.
Figure 11:
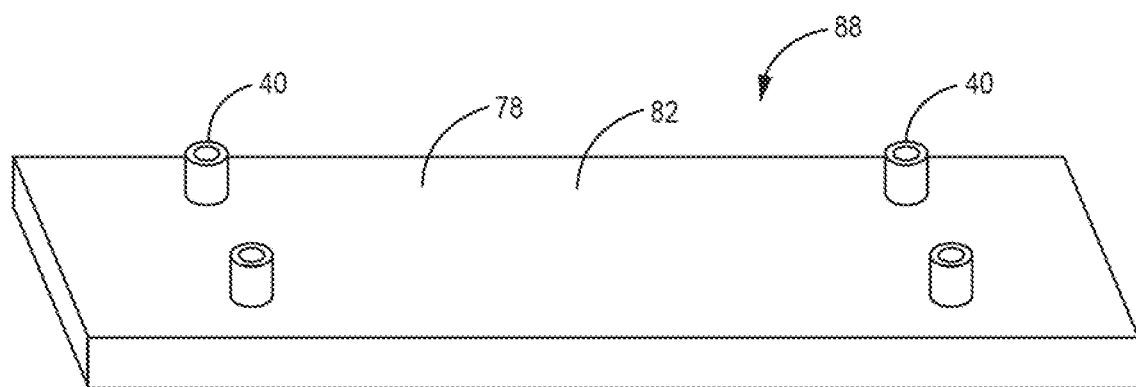
FIG. 11 is a view of a wood form with spacers secured therein.
Figure 14:
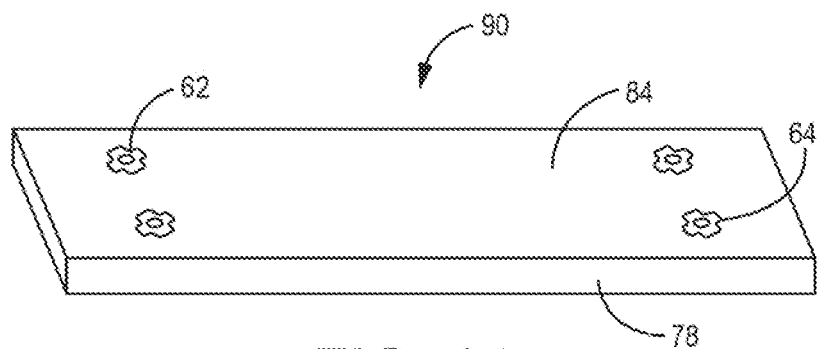
FIG. 14 is the wood form of FIG. 11 which is suitably ready for application of one of the upholstery case of FIG. 12 or the upholstery layers of FIG. 13.

FIGS. 10 and 11 illustrate the connection system 30 components of the spacer 40, T-nut 62, and wood form 78. The anchor portion 44 having an interference fit with wood form 78 in the hole and also the enlarged portion 70 of the barrel 68 of the T-nut 62. In embodiments, the anchor portion 44 may have the interference fit with one of the wood form 78 and T-nut 62 but not the other. In embodiments, the anchor portion 44 has a length less than the length of the hole. In embodiments, the anchor portion 44 has a length more than one half of the length of the hole. In embodiments, the anchor portion 44 has a length between 85 and 98 percent of the length of the hole. The end 58 of the anchor portion 44 may have a taper or tapers 59, 60 to act as guide-in surfaces for engagement with the T-nut 62, as best shown in FIG. 6. In embodiments, the spacer 40 may be inserted into the hole 80 at the side of the wood form 78 that will face inwardly with respect to the furniture frame or mechanism to which it is attached before the T-nut 62 is installed to act as a guide for placement of the T-nut 62. The spacer 40 is inserted until the stop surface 48 of the shoulder 47 abuts up against the inside facing surface 82 of the wood form 78. The T-nut 62 is hammered to drive the prongs 66 into the wood form 78 guided by the spacer 40. The spacer 40 should be held in place allowing the barrel 68 to be driven into the anchor portion 44. The spacers 40 then extend from the holes as shown in FIG. 11 at the side 88 of the wood form 78 that will face inwardly when assembled with the furniture frame or mechanism. The inwardly facing side 88 having the inwardly facing surface 82. The side 90 and surface 84 that will face outwardly is illustrated in FIG. 14 with the T-nut flanges 64 exposed on the outwardly facing surface 84. In embodiments, the upholstery may be pinched between the spacer shoulder 47 and the surface 82.

Figure 12:
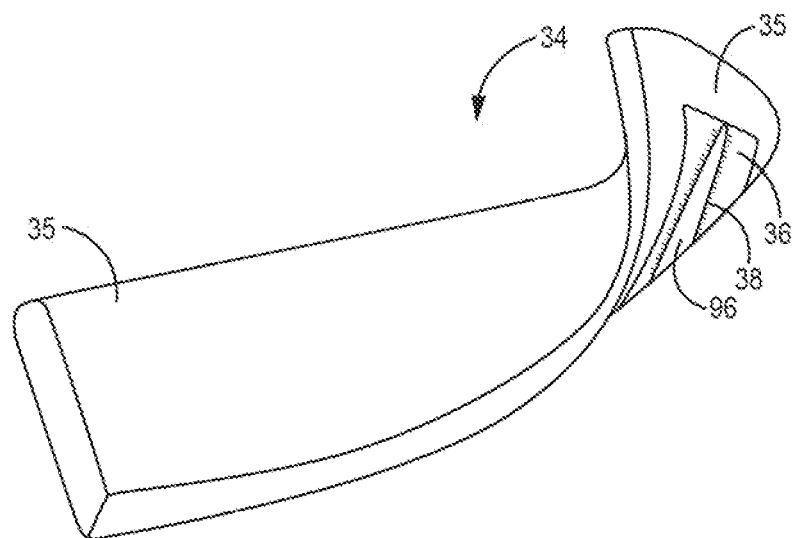
FIG. 12 is a view of a zippered upholstery case for securing to a wood form in accord with embodiments.

Referring to FIGS. 2, 3, 4 and 12, upholstery systems suitable for the wood form of FIGS. 9B and 14 are illustrated. The upholstery case 34 of FIG. 12 is assembled to the dimensions of the wood form and has an outer exposed upholstery material 35, a backing fabric 36 stitched to the upholstery outer material, and a zipper 38 defining an opening 96 into which the wood form may be inserted. The case may have additional upholstery layer or layers inside such as a foam layer.

Figure 13:
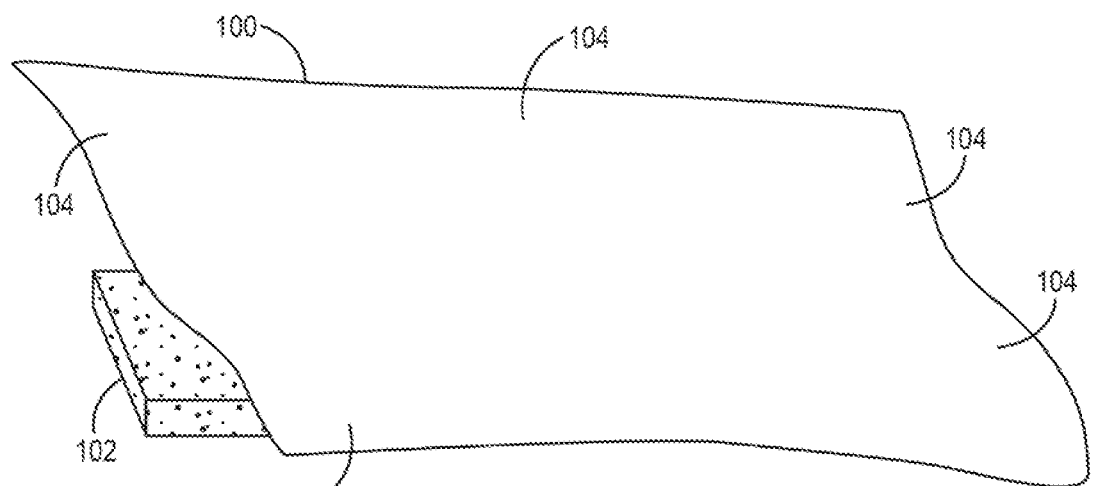
FIG. 13 is a view of upholstery layers comprising an outer upholstery layer and a foam layer.

FIG. 13 illustrates a piece of outwardly exposed upholstery material 100 that may be wrapped around the wood form with a layer of cushioning foam 102 between the wood form 78 and the upholstery material 100. The edge portions 104 may be attached to the inwardly facing surface 82 of the wood form 78 by staples.

Figure 15A:
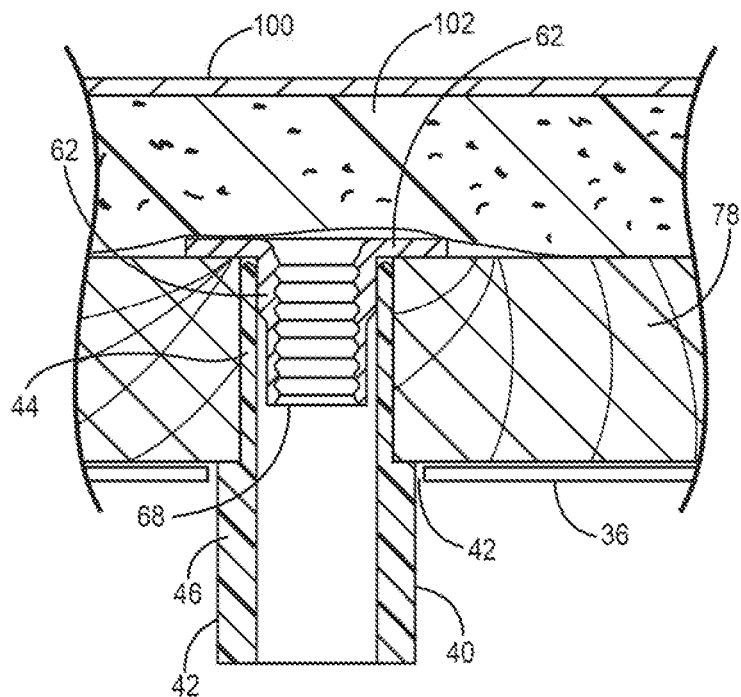
FIG. 15A is an exploded cross sectional view of a connection in accord with embodiments.
Figure 15A:
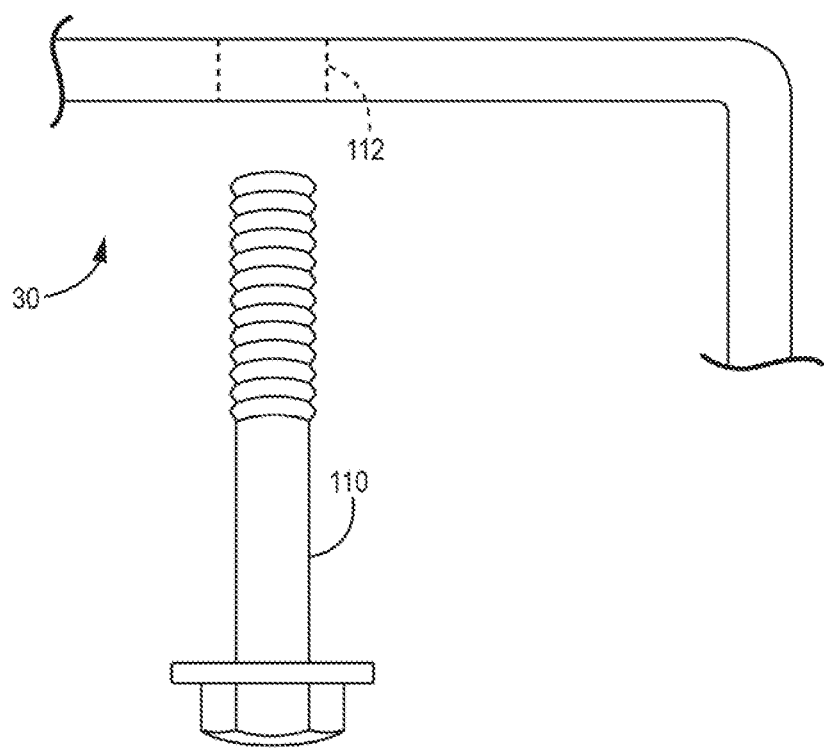
Figure 15B:
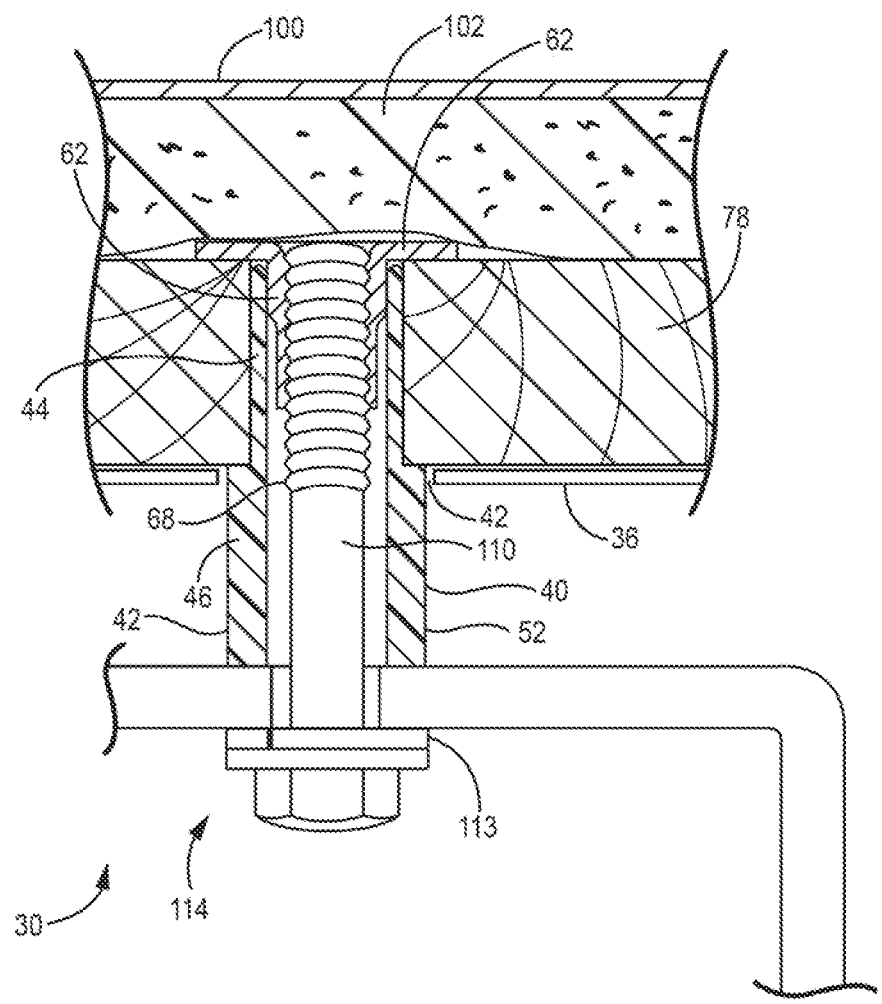
FIG. 15B is the components of FIG. 15A in an assembled state.

Referring to FIGS. 15A and 15B, an exploded view and an assembled view of the connection system 30 such as also shown in FIG. 1 for attaching an upholstered component 28, assembled as described above. The connection system includes a bolt 110 that extends through a hole 112 in a bracket, then is inserted into the spacer 40 that has previously been installed in the wood form 78 and is then threadably engaged with the threaded barrel 68 of the T-nut 62. A lock nut 113 may facilitate the integrity of the connection 114. The separator portion 46 may have a cylindrical outer surface 52 or may have a plurality of flats with a polygonal cross section.

Figure 16:
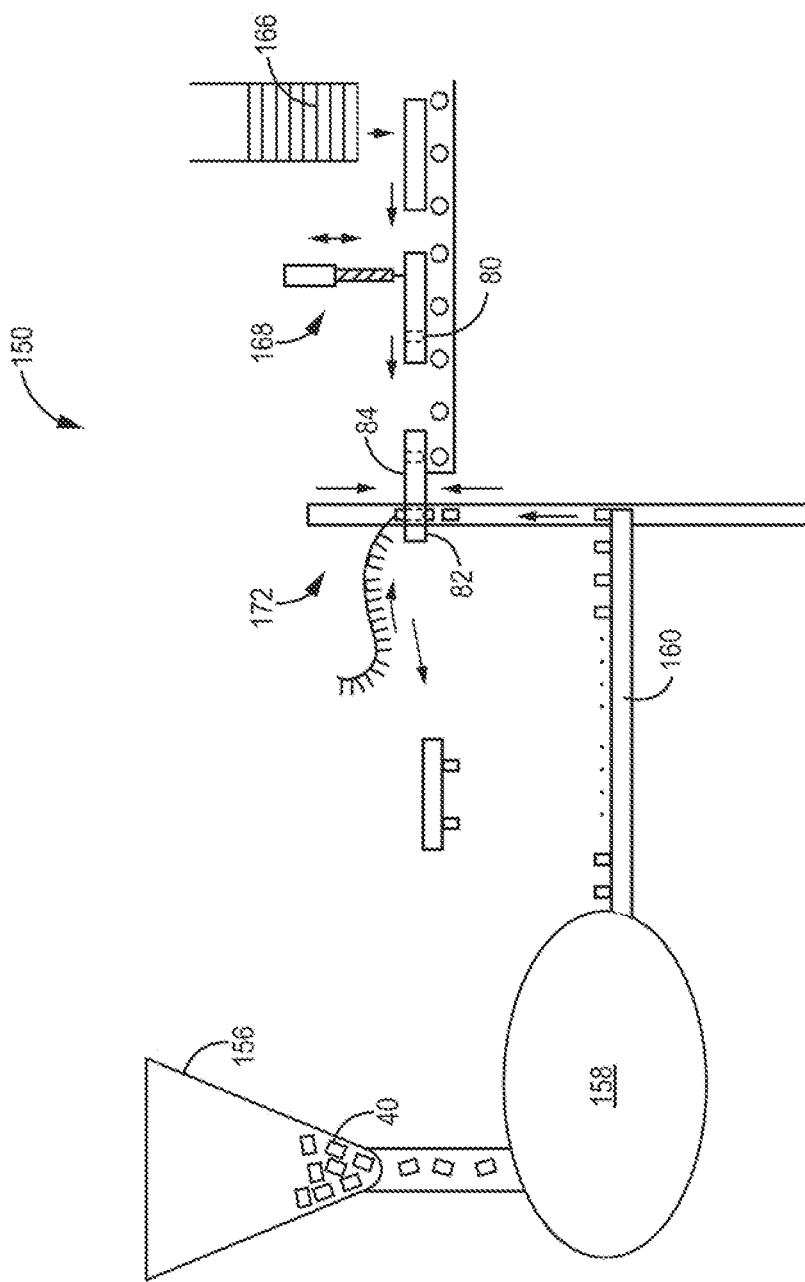
FIG. 16 is a schematic view of an automated assembly system in accord with embodiments.
Figure 17:
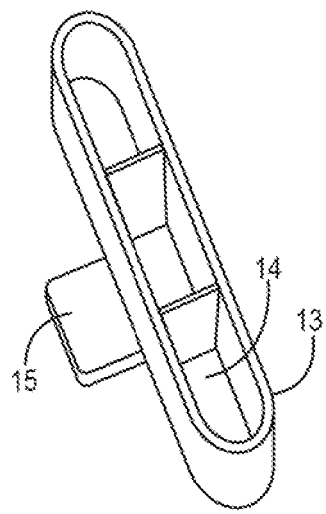
FIG. 17 is a prior art view of a spacer.
Figure 18:
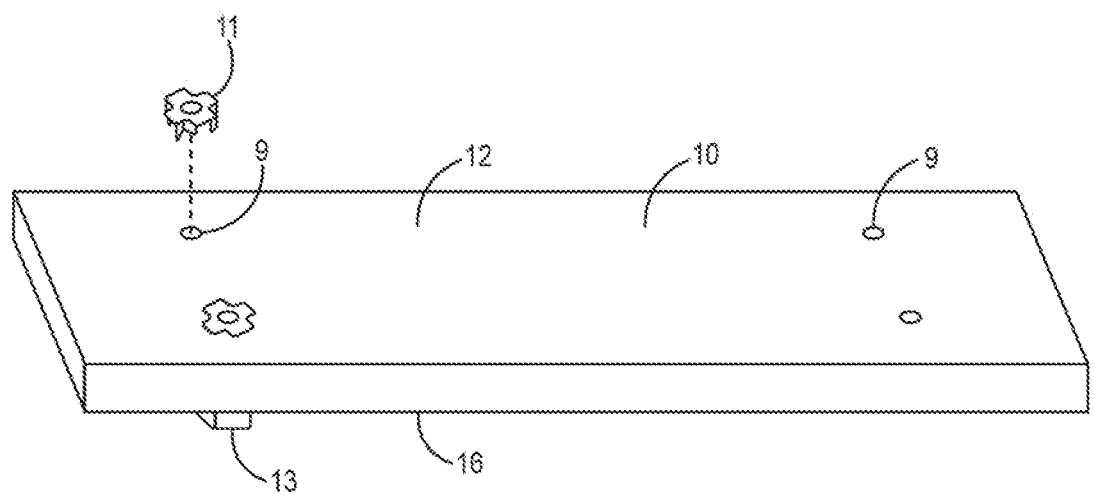
FIG. 18 is a prior art view of a wood form with a spacer and T-nuts.

Referring to FIG. 16, a schematic of an exemplary automated manufacturing system 150 is illustrated. The generally cylindrical spacers 40 may be loaded into a hopper 156 and arranged through equipment 158 to be put into a line of the spacers to be conveyed by a conveyor 160. At the same time a supply 166 or stack of wood forms 78 are serially fed to a first work station 168 where the holes are drilled in the proper location. The wood forms 78 with holes 80 are then serially conveyed to a second work station 172 where the spacers are installed at the to-be inwardly facing surface 82 and the T-nuts 62 are installed on the to-be outwardly facing surface 84 by pneumatics or the like. Referring to FIGS. 10 and 16, the anchor portion 44 of the spacer 40 is inserted in the holes 80 and may be used as a guide for the precise alignment of the T-nut barrels 68, or the equipment may be precise enough to center the T-nut barrel 68 in the hole 80 providing the proper annulus between the T-nut barrel 68 and wood form 78, without the spacer 40 therein, to interferingly receive the anchor portion 44 of the spacer 40. The T-nuts 62 and spacers 40 may be forced in with a hammer action by the equipment. Tapered surfaces 59, 60 may assist in the smooth entry of spacer 40 into hole 80 and further act as installation guides, such that barrel 68 slides within anchor portion as barrel 68 is forced within spacer 40.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed. The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. An upholstered component comprising a wood form, the wood form having an outwardly facing side with an outwardly facing surface, an inwardly facing side with an inwardly facing surface, and a plurality of holes extending through the wood form from the outwardly facing surface to the inwardly facing surface, each of the plurality of holes having a T-nut therein on the outwardly facing side, and each of the plurality of holes having a spacer having an anchor portion engaged with a T-nut barrel of the T-nut, the spacer further having a separator portion diametrically larger than the anchor portion and having a shoulder facing and engaging the inwardly facing surface, the separator portion projecting away from the inwardly facing surface a predetermined distance; and upholstery covering a plurality of sides of the wood form including the outwardly facing surface, the upholstery extending to the inwardly facing surface, the separator portion projecting outwardly past the upholstery attached to the inwardly facing surface.

2. The component of claim 1 wherein there is an annulus surrounding the T-nut barrel and the anchor portion is interferingly received in the annulus.

3. The component of claim 1, wherein the T-nut barrel has a nub engaging the anchor portion.

4. The component of claim 1, wherein the anchor portion extends greater than 80% of the distance from the inwardly facing surface to the outwardly facing surface.

5. The component of claim 1, wherein a flange of the T-nut comprises a plurality of prongs extending into the wood form.

6. The component of claim 5, wherein the anchor portion has an outer surface in contact with the hole and an inner surface in contact with the barrel of the T-nut.

7. The component of claim 1, wherein an end of the anchor portion at an end opposite the separator portion has a taper.

8. The upholstered component of claim 1, wherein the spacer at an end of the spacer within the hole is chamfered.

9. The upholstered component of claim 1, wherein a reduced diameter portion of the barrel and the anchor portion of the spacer define an annulus.

10. The upholstered component of claim 1, wherein a bolt received by the barrel further swages the anchor portion of the spacer as the bolt is tightened.

11. The upholstered component of claim 1, wherein the separator portion having a cylindrical exterior surface.

12. An upholstered component comprising a wood form, the wood form having an outwardly facing side with an outwardly facing surface, an inwardly facing side with an inwardly facing surface, and a plurality of holes extending through the wood form from the outwardly facing surface to the inwardly facing surface, each of the plurality of holes having a T-nut therein on the outwardly facing side, and each of the plurality of holes having a spacer having a cylindrical anchor portion with a bore engaged with a T-nut barrel and a cylindrically shaped separator portion with a bore, the spacer having a stop surface positioned between the cylindrical anchor portion and the cylindrically shaped separator portion, the stop surface engaging the inwardly facing surface of the wood form, the cylindrical spacer portion projecting outwardly from the inwardly facing surface a predetermined distance; and upholstery covering a plurality of sides of the wood form including the outwardly facing surface.

* * * * *